United States Patent
Moriya et al.

(10) Patent No.: US 11,654,789 B2
(45) Date of Patent: May 23, 2023

(54) ELECTRIC POWER SUPPLY SYSTEM

(71) Applicant: SUBARU CORPORATION, Tokyo (JP)

(72) Inventors: Fumiyuki Moriya, Tokyo (JP); Daisuke Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 709 days.

(21) Appl. No.: 16/738,830

(22) Filed: Jan. 9, 2020

(65) Prior Publication Data

US 2020/0307411 A1    Oct. 1, 2020

(30) Foreign Application Priority Data

Mar. 27, 2019   (JP) .............................. JP2019-059595

(51) Int. Cl.
*B60L 1/00* (2006.01)
*B60L 58/10* (2019.01)
(Continued)

(52) U.S. Cl.
CPC ............... *B60L 58/10* (2019.02); *B60L 1/003* (2013.01); *B60L 50/60* (2019.02); *B60L 50/64* (2019.02);
(Continued)

(58) Field of Classification Search
CPC .......... B60L 1/003; B60L 50/53; B60L 50/60; B60L 53/10; B60L 53/12; B60L 53/14;
(Continued)

(56) References Cited

U.S. PATENT DOCUMENTS

2005/0269981 A1* 12/2005 Sakurai ................. B60W 10/08
                                                              318/139
2009/0315518 A1* 12/2009 Soma ................... H01M 10/486
                                                              320/134
(Continued)

FOREIGN PATENT DOCUMENTS

JP       2011-199920 A    10/2011
JP       2013/255345      12/2013
(Continued)

OTHER PUBLICATIONS

Japanese Office Action, dated Nov. 15, 2022, in Japanese Application No. 2019-059595 and English Translation thereof.

*Primary Examiner* — Levi Gannon
(74) *Attorney, Agent, or Firm* — McGinn I.P. Law Group, PLLC.

(57) ABSTRACT

An electric power supply system includes a battery, an electric power receiving apparatus that is coupled to the battery in parallel with a load and receives and supplies external electric power to the battery, a switching apparatus that allows or cuts off connection of the electric power receiving apparatus and the load to the battery and is switchable between a normal state and a current suppression state when the connection is allowed, and a control apparatus that permits a load driving mode if the external electric power is receivable. In the load driving mode, the control apparatus controls an electrical connection state of the electric power supply system to a first connection state in which the electric power receiving apparatus and the load are coupled to the battery via the switching apparatus in the current suppression state, depending on output electric power of the electric power receiving apparatus.

16 Claims, 6 Drawing Sheets

(51) Int. Cl.
  *B60L 50/64*   (2019.01)
  *B60L 53/10*   (2019.01)
  *B60L 50/60*   (2019.01)
(52) U.S. Cl.
  CPC ......... *B60L 53/10* (2019.02); *B60L 2240/547* (2013.01); *B60L 2240/549* (2013.01)
(58) Field of Classification Search
  CPC .... B60L 53/20; B60L 58/10; B60L 58/12–15; H02J 7/0031; H02J 7/0048
  See application file for complete search history.

(56) References Cited

U.S. PATENT DOCUMENTS

| | | | | |
|---|---|---|---|---|
| 2010/0038962 | A1* | 2/2010 | Komatsu | B60L 58/12 307/10.1 |
| 2010/0060080 | A1* | 3/2010 | Sawada | B60W 20/00 307/48 |
| 2010/0138087 | A1* | 6/2010 | Takaoka | B60L 50/64 701/22 |
| 2011/0266868 | A1* | 11/2011 | Yamamoto | B60L 58/15 320/134 |
| 2012/0181990 | A1* | 7/2012 | Asakura | H02J 5/00 320/137 |
| 2014/0159478 | A1* | 6/2014 | Ang | B60L 1/003 307/9.1 |
| 2015/0298568 | A1* | 10/2015 | Mitsutani | B60W 10/26 180/65.21 |
| 2018/0294660 | A1* | 10/2018 | Byun | B60L 3/0069 |
| 2020/0039365 | A1* | 2/2020 | Chang | B60L 50/60 |
| 2020/0122584 | A1* | 4/2020 | Zhang | B60W 10/30 |
| 2020/0134944 | A1* | 4/2020 | Yumoto | B60L 3/04 |

FOREIGN PATENT DOCUMENTS

| | | |
|---|---|---|
| JP | 2015/104143 | 6/2015 |
| JP | 2015/104222 | 6/2015 |

\* cited by examiner

ELECTRIC POWER SUPPLY SYSTEM

CROSS-REFERENCE TO RELATED APPLICATIONS

The present application claims priority from Japanese Patent Application No. 2019-059595 filed on Mar. 27, 2019, the entire contents of which are hereby incorporated by reference.

BACKGROUND

The technology relates to an electric power supply system.

An electrically driven vehicle, such as an electric vehicle (EV) or a hybrid electric vehicle (HEV), is generally provided with a battery configured to store electric power to be supplied to a driving motor. In some electrically driven vehicles, the battery is chargeable with use of an external electric power source. Japanese Unexamined Patent Application Publication No. 2011-199920 discloses a technology related to an electric vehicle. The technology receives external electric power transmitted from an external electric power source, and supplies the external electric power to a battery to charge the battery.

SUMMARY

An aspect of the technology provides an electric power supply system including a battery, an electric power receiving apparatus, a switching apparatus, and a control apparatus. The electric power receiving apparatus is coupled to the battery in parallel with a load, and is configured to receive external electric power and supply the external electric power to the battery. The switching apparatus is configured to allow or cut off connection of the electric power receiving apparatus and the load to the battery, and is configured to be switched in state, when the electric power receiving apparatus and the load are coupled to the battery, between a normal state and a current suppression state in which flow of a current via the switching apparatus is suppressed more than in the normal state. The control apparatus is configured to permit a load driving mode of driving the load in a case where the electric power receiving apparatus is able to receive the external electric power, and is configured to, in the load driving mode, control an electrical connection state of the electric power supply system to a first connection state in which the electric power receiving apparatus and the load are coupled to the battery via the switching apparatus in the current suppression state, depending on output electric power of the electric power receiving apparatus.

An aspect of the technology provides an electric power supply system including a battery, an electric power receiving apparatus, a switching apparatus, and a control apparatus. The electric power receiving apparatus is coupled to the battery in parallel with a load, and is configured to receive external electric power and supply the external electric power to the battery. The switching apparatus is configured to allow or cut off connection of the electric power receiving apparatus and the load to the battery, and is configured to be switched in state, when the electric power receiving apparatus and the load are coupled to the battery, between a normal state and a current suppression state in which flow of a current via the switching apparatus is suppressed more than in the normal state. The control apparatus is configured to permit a load driving mode of driving the load in a case where the electric power receiving apparatus is able to receive the external electric power, and is configured to, in the load driving mode, couple the electric power receiving apparatus and the load to the battery, and switch the state of the switching apparatus between the normal state and the current suppression state, depending on output electric power of the electric power receiving apparatus.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
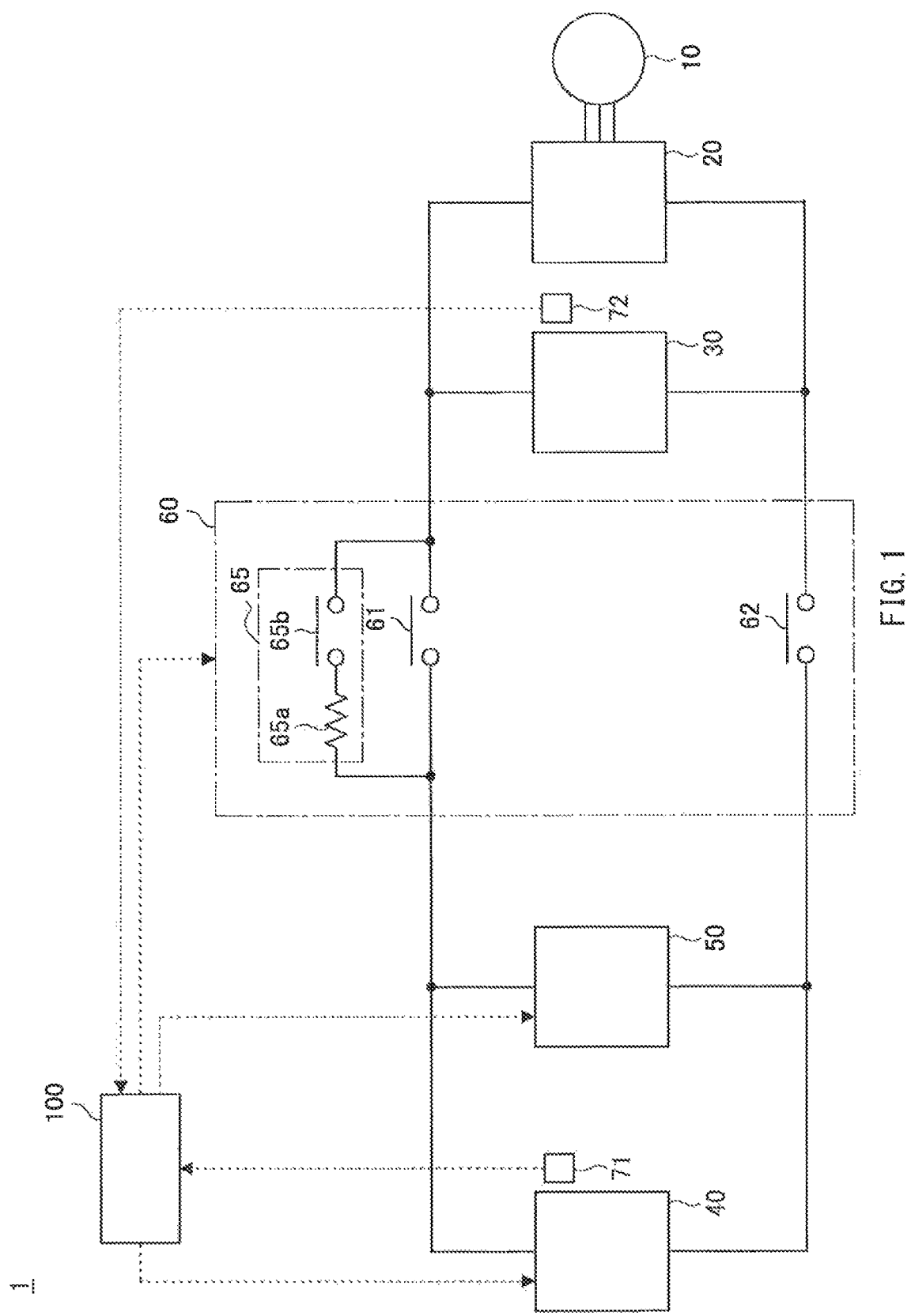
FIG. 1 is a schematic diagram illustrating an outline configuration of an electric power supply system according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

1. CONFIGURATION OF ELECTRIC POWER SUPPLY SYSTEM

Figure 2:
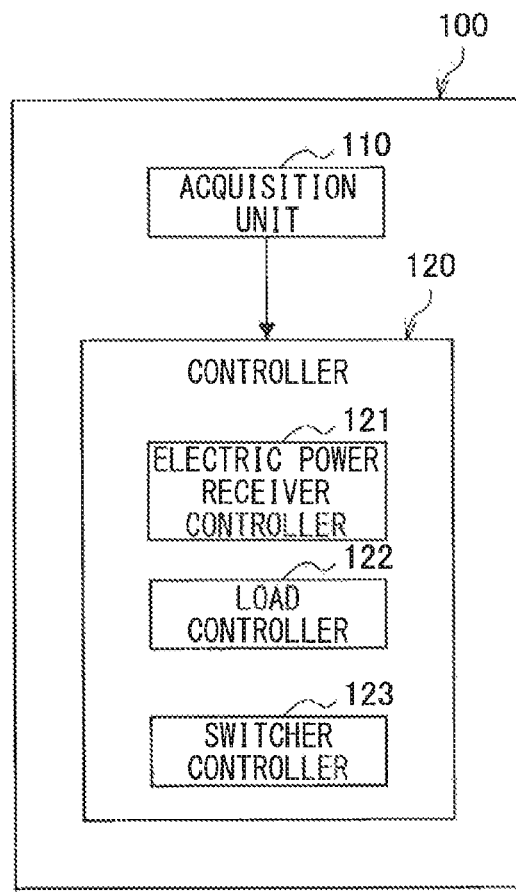
FIG. 2 is a block diagram illustrating an example of a configuration of a control apparatus according to the example embodiment.

With reference to FIGS. 1 and 2, description will be given on a configuration of an electric power supply system 1 according to one example embodiment of the technology. In one embodiment, the electric power supply system 1 may serve as an "electric power supply system".

FIG. 1 is a schematic diagram illustrating an outline configuration of the electric power supply system 1.

In one example, the electric power supply system 1 may be mounted on an electrically driven vehicle, such as an electric vehicle (EV) or a hybrid electric vehicle (HEV), and may be used to supply electric power to each apparatus in the vehicle. It is to be noted that the electrically driven vehicle may be any vehicle that includes a driving motor as a driving source and is caused to travel by torque of the driving motor, and examples may include a railway vehicle as well as an automobile.

As illustrated in FIG. 1, the electric power supply system 1 may include a driving motor 10, an inverter 20, a battery 30, an electric power receiver 40, a load 50, a switcher 60, an electric power receiver sensor 71, a battery sensor 72, and a control apparatus 100. The vehicle equipped with the electric power supply system 1 may travel by using the driving motor 10 as a driving source. In one embodiment, the battery 30 may serve as a "battery". In one embodiment, the electric power receiver 40 may serve as an "electric power receiving apparatus". In one embodiment, the load 50 may serve as a "load". In one embodiment, the switcher 60 may serve as a "switching apparatus". In one embodiment, the control apparatus 100 may serve as a "control apparatus".

The driving motor 10 may be a motor that outputs motive power to be transmitted to a driving wheel, and may be, in one example, a polyphase alternating current (e.g., three-phase alternating current) motor. The driving motor 10 may be coupled to the battery 30 via the inverter 20, and may generate the motive power by using electric power supplied from the battery 30 via the inverter 20. The driving motor 10 may also serve as an electric power generator that regeneratively generates electric power by using rotational energy of the driving wheel when the vehicle decelerates.

The inverter 20 may be an electric power converter that is able to bidirectionally execute conversion between direct-current electric power and alternating-current electric power, and may include, in one example, a polyphase bridge circuit. The inverter 20 may be configured to convert direct-current electric power supplied from the battery 30 into alternating-current electric power, and supply the alternating-current electric power to the driving motor 10. The inverter 20 may also be configured to convert alternating-current electric power regeneratively generated by the driving motor 10 into direct-current electric power, and supply the direct-current electric power to the battery 30. The inverter 20 may be provided with a switching device, and the electric power conversion by the inverter 20 may be controlled by controlling operation of the switching device.

The battery 30 may be configured to store electric power to be supplied to the driving motor 10. As the battery 30, for example, a secondary battery may be used, such as a lithium ion battery, a lithium-ion polymer battery, a nickel-metal hydride battery, a nickel-cadmium battery, or a lead-acid battery.

The electric power receiver 40 is coupled to the battery 30, and is able to receive external electric power transmitted from an external electric power source (i.e., an electric power source outside the vehicle equipped with the electric power supply system 1). Because the electric power supply system 1 is thus provided with the electric power receiver 40, it is possible to charge the battery 30 with the external electric power supplied from the external electric power source via the electric power receiver 40.

In one example, the electric power receiver 40 may be able to receive electric power transmitted from the external electric power source in a state of being physically coupled to the external electric power source. For example, the electric power receiver 40 may be provided with a transformer that is able to convert voltage. The transformer makes it possible to convert a voltage of the external electric power transmitted from the external electric power source. The electric power receiver 40 may also be provided with an electric power converter that is able to convert alternating-current electric power into direct-current electric power. The electric power converter makes it possible to, in a case where the external electric power source is an alternating-current electric power source, convert alternating-current external electric power transmitted from the external electric power source into direct-current electric power.

In another example, the electric power receiver 40 may be able to receive, in a noncontact manner, the external electric power transmitted from the external electric power source. In that case, for example, the electric power receiver 40 may be provided with an electric power receiving coil that is able to receive alternating-current external electric power transmitted from an electric power transmitting coil of the external electric power source, and an electric power converter that is able to convert the external electric power into direct-current electric power. As a method of transmitting electric power from the electric power transmitting coil to the electric power receiving coil, a magnetic resonance method or an electromagnetic induction method may be used, for example.

The load 50 may be coupled to the battery 30 in parallel with the electric power receiver 40. For example, an apparatus such as an air-conditioning apparatus or a car navigation apparatus may correspond to an example of the load 50.

The switcher 60 is configured to allow or cut off electrical connection of the electric power receiver 40 and the load 50 to the battery 30. The switcher 60 may be provided between the battery 30, and the electric power receiver 40 and the load 50. In a case where the electric power receiver 40 and the load 50 are coupled to the battery 30 to allow for electric power supply via the switcher 60, the switcher 60 is switchable between a normal state and a current suppression state. The current suppression state has a current suppression effect (i.e., an effect of making it difficult for current to pass) higher than that of the normal state. For example, the switcher 60 may include a relay (e.g., a positive electrode-side relay 61 described later) and a current suppressor 65 having a current suppression effect higher than that of the relay. The relay and the current suppressor 65 may be coupled in parallel to each other.

In one example, as illustrated in FIG. 1, the switcher 60 may include the positive electrode-side relay 61 to be coupled to a positive electrode side of the battery 30, a negative electrode-side relay 62 to be coupled to a negative electrode side of the battery 30, and the current suppressor 65. The current suppressor 65 may include a pre-charge resistor 65a and a pre-charge relay 65b that are coupled in series to each other. The pre-charge resistor 65a and the pre-charge relay 65b may be coupled in parallel to the positive electrode-side relay 61. It is to be noted that the pre-charge resistor 65a and the pre-charge relay 65b may be directed to suppressing flow of rush current in the system upon startup of the electric power supply system 1.

As described above, the positive electrode-side relay 61 may correspond to an example of the relay coupled in parallel to the current suppressor 65. Providing the pre-charge resistor 65a in the current suppressor 65 makes an electric resistance of the current suppressor 65 larger than an electric resistance of the positive electrode-side relay 61. This makes a current suppression effect of the current suppressor 65 higher than a current suppression effect of the positive electrode-side relay 61.

In the example illustrated in FIG. 1, the current suppressor 65 may include the pre-charge resistor 65a and the pre-charge relay 65b. However, a current suppressor according to any embodiment of the technology is not limited to the above example, as long as it has a current suppression effect higher than that of a relay that is coupled in parallel to the current suppressor.

For example, the current suppressor according to any embodiment of the technology may be a current suppressor adopting, in place of the pre-charge resistor 65a in the example illustrated in FIG. 1, a diode or a switching device, such as a metal oxide semiconductor field effect transistor (MOSFET), that restricts flow of current to only one direction from the battery 30 toward the load 50. In a case where the current suppressor adopting the switching device such as a MOSFET is used, controlling a duty ratio of switching operation of the switching device makes it possible to control a current suppression effect offered by the switching device. It is to be noted that, in this case, a smoothing capacitor may be further provided in the electric power supply system 1 to suppress destabilization of current due to repetition of the switching operation of the switching device. Alternatively, the current suppressor according to any embodiment of the technology may be a current suppressor including no relay (e.g., including only the pre-charge resistor 65a, including only the above diode, or including only the above switching device).

In another example, a portion serving as a current suppressor may be provided separately from the pre-charge resistor 65a and the pre-charge relay 65b in the example illustrated in FIG. 1. For example, a portion having a current suppression effect higher than that of the negative electrode-side relay 62 may be provided in parallel with the negative electrode-side relay 62, in addition to the example illustrated in FIG. 1. In that case, the portion coupled in parallel to the negative electrode-side relay 62 may serve as a current suppressor. The portion may be, for example, a resistor, a diode, or a switching device, as described above. This makes it possible to set a degree of current suppression by the current suppressor, regardless of an electric resistance of the pre-charge resistor 65a.

In the example illustrated in FIG. 1, the switcher 60 may include the relay (e.g., the positive electrode-side relay 61) and the current suppressor 65 that are coupled in parallel to each other. However, a switcher according to any embodiment of the technology is not limited to the above example as long as, in a case where the electric power receiver 40 and the load 50 are coupled to the battery 30 to allow for electric power supply via the switcher 60, it is possible to switch between the normal state and the current suppression state having a current suppression effect higher than that of the normal state.

For example, the switcher according to any embodiment of the technology may be a switcher in which a device that is able to adjust current at an installation position is coupled in series to the relay (e.g., the positive electrode-side relay 61). Examples of the device may include a switching device and a variable resistor. In this case, operation of the device such as a switching device or a variable resistor may be controlled to adjust a current flowing through the relay coupled in series to the device. This makes it possible to switch the switcher between the normal state and the current suppression state. Therefore, in this case, it is unnecessary to provide a current suppressor that is coupled in parallel to the relay. Among these examples, in regard to the example of using the switching device, a relay that is coupled in series to the switching device may be further omitted. One reason for this is that, even in a case where the relay is omitted, controlling operation of the switching device makes it possible for the switcher to electrically cut off the electric power receiver 40 and the load 50 from the battery 30. It is to be noted that the switcher according to any embodiment of the technology may be a switcher in which both the positive electrode-side relay 61 and the negative electrode-side relay 62 are replaced with a switching device.

The electric power receiver sensor 71 may detect electrical quantities of state of the electric power receiver 40, and output the detected electrical quantities of state to the control apparatus 100. In one example, the electric power receiver sensor 71 may detect voltage and current of the electric power receiver 40, as the electrical quantities of state of the electric power receiver 40.

The battery sensor 72 may detect electrical quantities of state of the battery 30, and output the detected electrical quantities of state to the control apparatus 100. In one example, the battery sensor 72 may detect, as the electrical quantities of state of the battery 30, a remaining capacity (state of charge or SOC) of the battery 30 and current values of input and output currents of the battery 30 (i.e., current inputted to the battery 30 and current outputted from the battery 30).

The control apparatus 100 may include a central processing unit (CPU), a read only memory (ROM), and a random access memory (RAM), for example. The CPU may be an arithmetic processing unit. The ROM may be a storage device that stores information such as programs and operation parameters to be used by the CPU. The RAM may be a storage device that temporarily stores parameters, for example, that change as appropriate in execution of the CPU.

The control apparatus 100 may communicate with each apparatus mounted on the electric power supply system 1. The control apparatus 100 may communicate with each apparatus by, for example, controller area network (CAN) communication.

It is to be noted that operations of the control apparatus 100 according to the example embodiment may at least partially be shared by a plurality of control apparatuses, or a plurality of operations may be implemented by one control apparatus. In a case where the operations of the control apparatus 100 are at least partially shared by a plurality of control apparatuses, the plurality of control apparatuses may be coupled to each other via a communication bus of CAN, for example.

For example, the control apparatus 100 may include an acquisition unit 110 and a controller 120, as illustrated in FIG. 2.

The acquisition unit 110 may acquire various kinds of information to be used in a process performed by the controller 120, and output the acquired information to the controller 120. For example, the acquisition unit 110 may communicate with the electric power receiver sensor 71 and the battery sensor 72 to acquire various kinds of information outputted from the respective sensors.

The controller 120 may control operation of each apparatus of the electric power supply system 1. For example, the controller 120 may include an electric power receiver controller 121, a load controller 122, and a switcher controller 123.

The electric power receiver controller 121 may control operation of the electric power receiver 40. For example, the electric power receiver controller 121 may control a voltage of the electric power receiver 40, by controlling supply of external electric power to the electric power supply system 1 by the electric power receiver 40. In one example, in a case where the electric power receiver 40 is provided with an electric power converter that is able to convert alternating-current electric power into direct-current electric power, it is possible for the electric power receiver controller 121 to control the external electric power supplied via the electric power receiver 40, by controlling operation of the electric power converter. In another example, the electric power receiver controller 121 may control the external electric power supplied via the electric power receiver 40, by outputting a control command to the external electric power source.

The load controller 122 may control operation of the load 50. In one example, the load controller 122 may drive or stop the load 50, by controlling electric power supply to the load 50. For example, it is possible for the load controller 122 to control the electric power supply to the load 50, by controlling operation of a switch (not illustrated), for example, that is able to adjust electric power supplied to the load 50.

The switcher controller 123 may control operation of the switcher 60. In one example, the switcher controller 123 may control an electrical connection state of the electric power supply system 1, by controlling an open/closed state of each relay of the switcher 60.

Here, in a state in which the electric power receiver 40 is able to receive power, the controller 120 is able to execute a load driving mode of permitting driving of the load 50. For example, the vehicle equipped with the electric power supply system 1 may be provided with an input apparatus, such as a button, directed to selecting execution or stop of the load driving mode. It is possible for the driver to select execution or stop of the load driving mode by operating the input apparatus. In a case where execution of the load driving mode is selected by the driver, the controller 120 may execute the load driving mode.

In the load driving mode, for example, it is possible to drive the load 50 by using the external electric power supplied via the electric power receiver 40. However, in the load driving mode, electric power stored in the battery 30 may be used to drive the load 50 in some cases. When the battery 30 is thus discharged, the remaining capacity of the battery 30 decreases, in which case charging of the battery 30 may be performed. Therefore, in existing techniques, repetition of charging and discharging of the battery 30 in the load driving mode can promote deterioration of the battery 30.

In the electric power supply system 1 according to the example embodiment, the controller 120 may set, in the load driving mode, the electrical connection state of the electric power supply system 1 to a first connection state, depending on output electric power of the electric power receiver 40. In the first connection state, the electric power receiver 40 and the load 50 may be coupled to the battery 30 to allow for electric power supply via the switcher 60 in the current suppression state. This makes it possible to appropriately suppress deterioration of the battery 30. A process related to such control of the electrical connection state of the electric power supply system 1 during the execution of the load driving mode by the controller 120 will be described in detail later.

2. OPERATION OF ELECTRIC POWER SUPPLY SYSTEM

Now, with reference to FIGS. 3 to 7, description will be given on operation of the electric power supply system 1 according to the example embodiment of the technology. The following description describes, as examples of a flow of a process that is performed by the control apparatus 100, a first example and a second example in this order.

2-1. First Example

First, with reference to FIGS. 3 to 5, description will be given on the first example of the flow of the process performed by the control apparatus 100.

Figure 3:
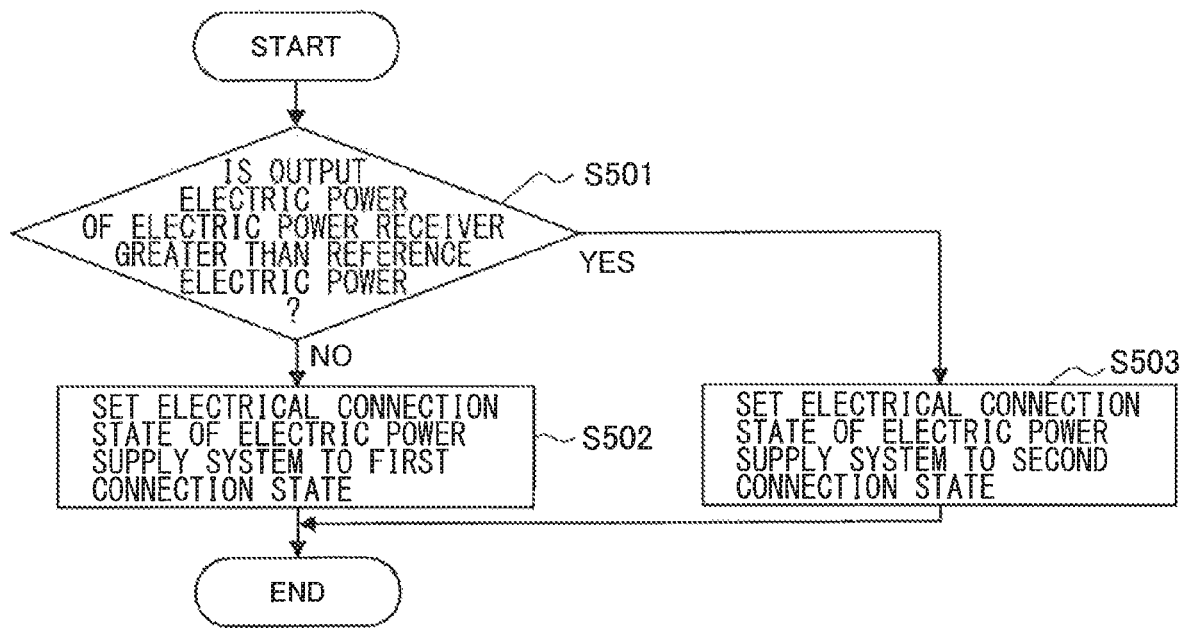
FIG. 3 is a flowchart illustrating a first example of a flow of a process that is performed by the control apparatus according to the example embodiment.

FIG. 3 is a flowchart illustrating the first example of the flow of the process performed by the control apparatus 100. In one example, the control flow illustrated in FIG. 3 may be repeatedly executed by the controller 120 during the execution of the load driving mode.

When the control flow illustrated in FIG. 3 is started, first, in step S501, the controller 120 may determine whether the output electric power of the electric power receiver 40 is greater than reference electric power. If it is determined that the output electric power of the electric power receiver 40 is equal to or less than the reference electric power (step S501/NO), the control flow may proceed to step S502. If it is determined that the output electric power of the electric power receiver 40 is greater than the reference electric power (step S501/YES), the control flow may proceed to step S503.

The output electric power of the electric power receiver 40 may be electric power outputted by the electric power receiver 40. It is possible for the controller 120 to calculate the output electric power of the electric power receiver 40 on the basis of, for example, the voltage and the current of the electric power receiver 40 detected by the electric power receiver sensor 71.

In one example, the reference electric power may correspond to an upper limit of a range of electric power that is allowed to be continuously outputted from the electric power receiver 40.

It is to be noted that, in step S501, the controller 120 may determine YES in a case where the output electric power of the electric power receiver 40 actually exceeds the reference electric power. Alternatively, the controller 120 may determine YES in a case where the output electric power of the electric power receiver 40 is predicted to exceed the reference electric power. For example, the controller 120 is able to predict that the output electric power of the electric power receiver 40 exceeds the reference electric power, on the basis of a history of the output electric power of the electric power receiver 40 or transition of electric power consumed by the load 50.

If the determination result is NO in step S501, in step S502, the controller 120 may set the electrical connection state of the electric power supply system 1 to the first connection state.

The first connection state will be described with reference to FIG. 4. FIG. 4 is a diagram illustrating the first connection state out of the electrical connection states of the electric power supply system 1. For easier understanding, FIG. 4 does not illustrate the sensors and the control apparatus 100.

The first connection state may be a connection state in which the electric power receiver 40 and the load 50 are coupled to the battery 30 to allow for electric power supply via the switcher 60 in the current suppression state. In the example embodiment, the first connection state may be a connection state in which, as illustrated in FIG. 4, the positive electrode-side relay 61 is open, and the electric power receiver 40 and the load 50 are coupled to the battery 30 to allow for electric power supply via the current suppressor 65.

Figure 4:
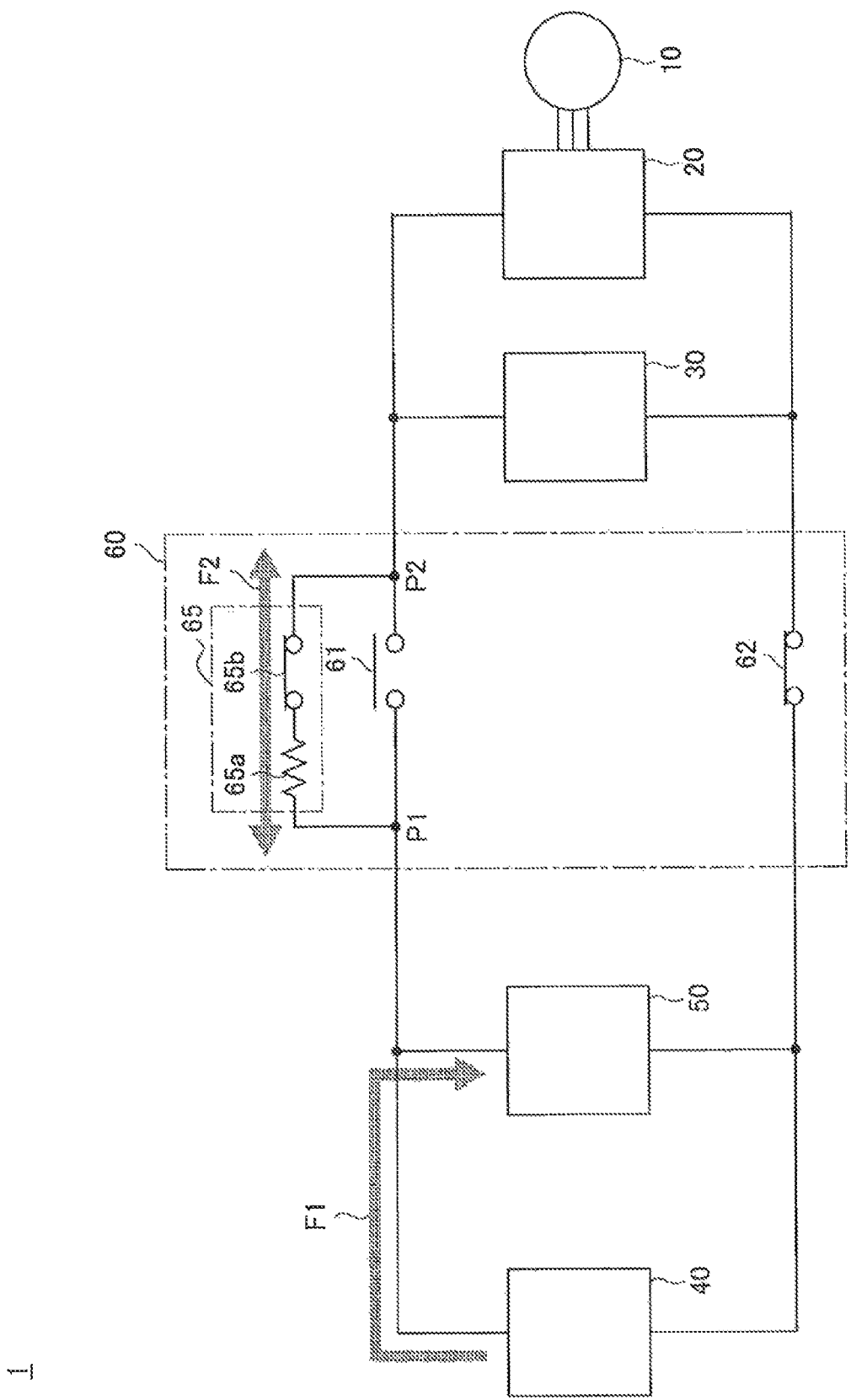
FIG. 4 is a diagram illustrating a first connection state out of electrical connection states of the electric power supply system according to the example embodiment.
Figure 5:
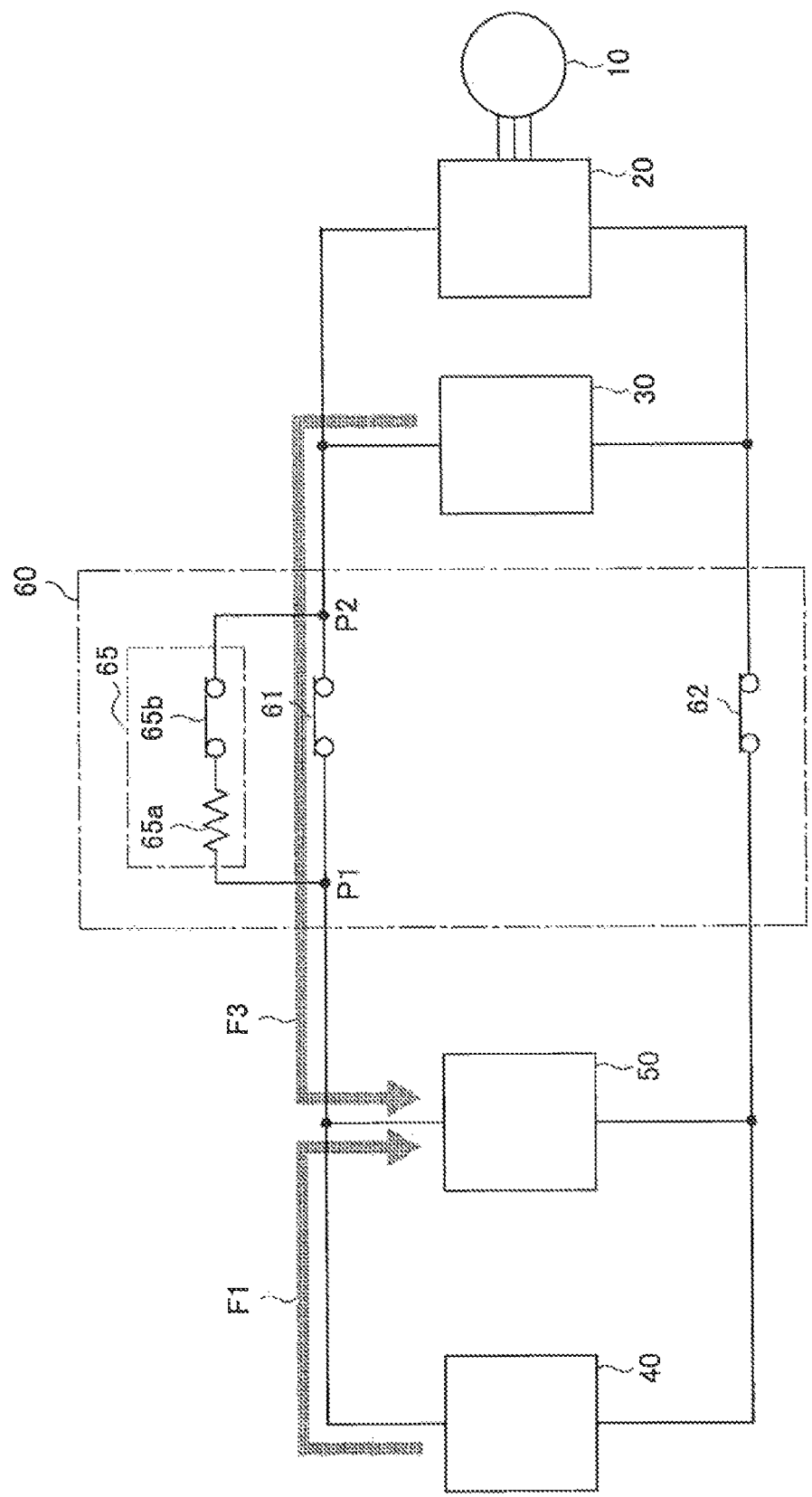
FIG. 5 is a diagram illustrating a second connection state out of the electrical connection states of the electric power supply system according to the example embodiment.

For example, in the example illustrated in FIG. 4, the open/closed states of the positive electrode-side relay 61, the negative electrode-side relay 62, and the pre-charge relay 65b are respectively the open state, the closed state, and the closed state. Therefore, as indicated by arrow F1 in FIG. 4, electric power may be supplied from the electric power receiver 40 to the load 50. The electric power receiver 40 and the load 50 may be coupled to the battery 30 to allow for electric power supply via the current suppressor 65. Accordingly, as indicated by arrow F2 in FIG. 4, electric power supply may occur between the load 50 and the battery 30, but a current flowing between the load 50 and the battery 30 may be suppressed by the current suppressor 65. Thus, in the first connection state, the electric power receiver 40 and the load 50 may be coupled to the battery 30 to allow for electric power supply via the switcher 60 in the current suppression state. This makes it possible to suppress the input and output currents of the battery 30 (i.e., suppress charging and discharging of the battery 30), while suppressing an excessive increase in a difference between a voltage on the load 50 side with respect to the switcher 60 (e.g., a voltage at point P1 in FIG. 4) and a voltage on the battery 30 side with respect to the switcher 60 (e.g., a voltage at point P2 in FIG. 4). Suppressing an excessive increase in voltage difference between the load 50 side and the battery 30 side with respect to the switcher 60 makes it possible to attain a state in which welding of the positive electrode-side relay 61 is suppressed when the switcher 60 is switched to the normal state (i.e., when the electrical connection state of the electric power supply system 1 is set to a second connection state). This will be described later. In addition, suppressing the input and output currents of the battery 30 makes it possible to suppress deterioration of the battery 30 due to repetition of charging and discharging of the battery 30.

In terms of effectively suppressing the input and output currents of the battery 30, while the electrical connection state of the electric power supply system 1 is the first connection state in the load driving mode, the controller 120 may control the voltage of the electric power receiver 40 to suppress the input and output currents of the battery 30. In one example, in a case where the current value of the current outputted from the battery 30 has increased, it is possible to appropriately suppress the current outputted from the battery 30 by increasing the voltage of the electric power receiver 40. In a case where the current value of the current inputted to the battery 30 has increased, it is possible to appropriately suppress the current inputted to the battery 30 by reducing the voltage of the electric power receiver 40.

If the determination result is YES in step S501, in step S503, the controller 120 may set the electrical connection state of the electric power supply system 1 to the second connection state.

The second connection state will be described with reference to FIG. 5. FIG. 5 is a diagram illustrating the second connection state out of the electrical connection states of the electric power supply system 1. For easier understanding, FIG. 5 does not illustrate the sensors and the control apparatus 100.

The second connection state may be a connection state in which the electric power receiver 40 and the load 50 are coupled to the battery 30 to allow for electric power supply via the switcher 60 in the normal state. In the example embodiment, the second connection state may be a connection state in which, as illustrated in FIG. 5, the electric power receiver 40 and the load 50 are coupled to the battery 30 to allow for electric power supply via the positive electrode-side relay 61.

In one example, in the second connection state, the open/closed states of the positive electrode-side relay 61, the negative electrode-side relay 62, and the pre-charge relay 65b may all be the closed state. In other words, if it is determined that the output electric power of the electric power receiver 40 is greater than the reference electric power, the controller 120 may close the positive electrode-side relay 61 to set the electrical connection state of the electric power supply system 1 to the second connection state. Therefore, as indicated by arrow F1 in FIG. 5, electric power may be supplied from the electric power receiver 40 to the load 50, as in the first connection state. The electric power receiver 40 and the load 50 may be coupled to the battery 30 to allow for electric power supply via the positive electrode-side relay 61. Accordingly, as indicated by arrow F3 in FIG. 5, it is possible to supply electric power from the battery 30 to the load 50 via the positive electrode-side relay 61. Thus, in the second connection state, the electric power receiver 40 and the load 50 may be coupled to the battery 30 to allow for electric power supply via the switcher 60 in the normal state. Here, the output electric power of the electric power receiver 40 being greater than the reference electric power indicates difficulty of covering the electric power consumed by the load 50 by only the output electric power of the electric power receiver 40. Therefore, in such a case, the suppression of the input and output currents of the battery 30 by the current suppressor 65 may be canceled to supply electric power from the battery 30 to the load 50. This makes it possible to suppress lack of the electric power supplied to the load 50.

When the electrical connection state of the electric power supply system 1 is set to the second connection state (e.g., when the positive electrode-side relay 61 is closed to couple the electric power receiver 40 and the load 50 to the battery 30 to allow for electric power supply via the positive electrode-side relay 61), welding of the positive electrode-side relay 61 can occur in a case where the voltage difference is excessively large between the load 50 side and the battery 30 side with respect to the switcher 60. In one example, under a situation in which the output electric power of the electric power receiver 40 is large enough to exceed the reference electric power, an increase in the output electric power of the electric power receiver 40 tends to cause the voltage of the electric power receiver 40 to decrease. Accordingly, the voltage on the battery 30 side with respect to the switcher 60 is likely to be relatively larger than the voltage on the load 50 side.

In the electric power supply system 1, if it is determined that the output electric power of the electric power receiver 40 is equal to or less than the reference electric power, the electrical connection state of the electric power supply system 1 may be set to the first connection state. In the first connection state, the electric power receiver 40 and the load 50 may be coupled to the battery 30 to allow for electric power supply via the switcher 60 in the current suppression state. This makes it possible to suppress an excessive increase in voltage difference between the load 50 side and the battery 30 side with respect to the switcher 60. This helps to suppress welding of the positive electrode-side relay 61 when the switcher 60 is switched to the normal state (i.e., when the electrical connection state of the electric power supply system 1 is set to the second connection state).

After step S502 or step S503, the control flow illustrated in FIG. 3 may end.

As described above, in the control flow illustrated in FIG. 3, while the output electric power of the electric power receiver 40 increases, it is possible to switch the electrical connection state of the electric power supply system 1 in order of the first connection state and the second connection state. It is possible to suppress welding of the positive electrode-side relay 61 by setting the electrical connection state of the electric power supply system 1 to the first connection state before setting the electrical connection state of the electric power supply system 1 to the second connection state.

The above description describes an example in which, in the load driving mode, the electrical connection state of the electric power supply system 1 is switched depending on the output electric power of the electric power receiver 40. However, a trigger other than the output electric power of the electric power receiver 40 may be used to cause the controller 120 to switch the electrical connection state of the electric power supply system 1.

For example, in terms of effectively suppressing welding of the positive electrode-side relay 61, even if it is determined that the output electric power of the electric power receiver 40 is greater than the reference electric power in the load driving mode, the controller 120 may prohibit the electrical connection state of the electric power supply system 1 from being set to the second connection state if it is determined that an amount of decrease per unit time in the voltage on the load 50 side with respect to the switcher 60 (e.g., the voltage at point P1 in FIG. 4) is larger than a reference amount of decrease. The reference amount of decrease may be set as appropriate to a value that allows appropriate determination of whether the voltage difference is relatively likely to excessively increase between the load 50 side and the battery 30 side with respect to the switcher 60. The controller 120 may calculate the amount of decrease per unit time in the voltage on the load 50 side with respect to the switcher 60 (e.g., the voltage at point P1 in FIG. 4) on the basis of, for example, an amount of decrease in the voltage of the electric power receiver 40 detected by the electric power receiver sensor 71.

In another example, in terms of suppressing wear due to open/close operation of the positive electrode-side relay 61, after setting the electrical connection state of the electric power supply system 1 to the second connection state in the load driving mode, the controller 120 may keep the electrical connection state of the electric power supply system 1 at the second connection state, regardless of the output electric power of the electric power receiver 40, until a reference time passes. The reference time may be set as appropriate to a value that allows appropriate suppression of excessively frequent execution of the open/close operation of the positive electrode-side relay 61.

In another example, in terms of suppressing a decrease in the remaining capacity of the battery 30, after setting the electrical connection state of the electric power supply system 1 to the second connection state in the load driving mode, the controller 120 may keep the electrical connection state of the electric power supply system 1 at the second connection state, regardless of the output electric power of the electric power receiver 40, until the remaining capacity of the battery 30 reaches a reference remaining capacity. The reference remaining capacity may be set as appropriate to a value that allows appropriate determination of whether the battery 30 is sufficiently charged.

2-2. Second Example

Now, with reference to FIGS. 6 and 7, description will be given on the second example of the flow of the process performed by the control apparatus 100.

Figure 6:
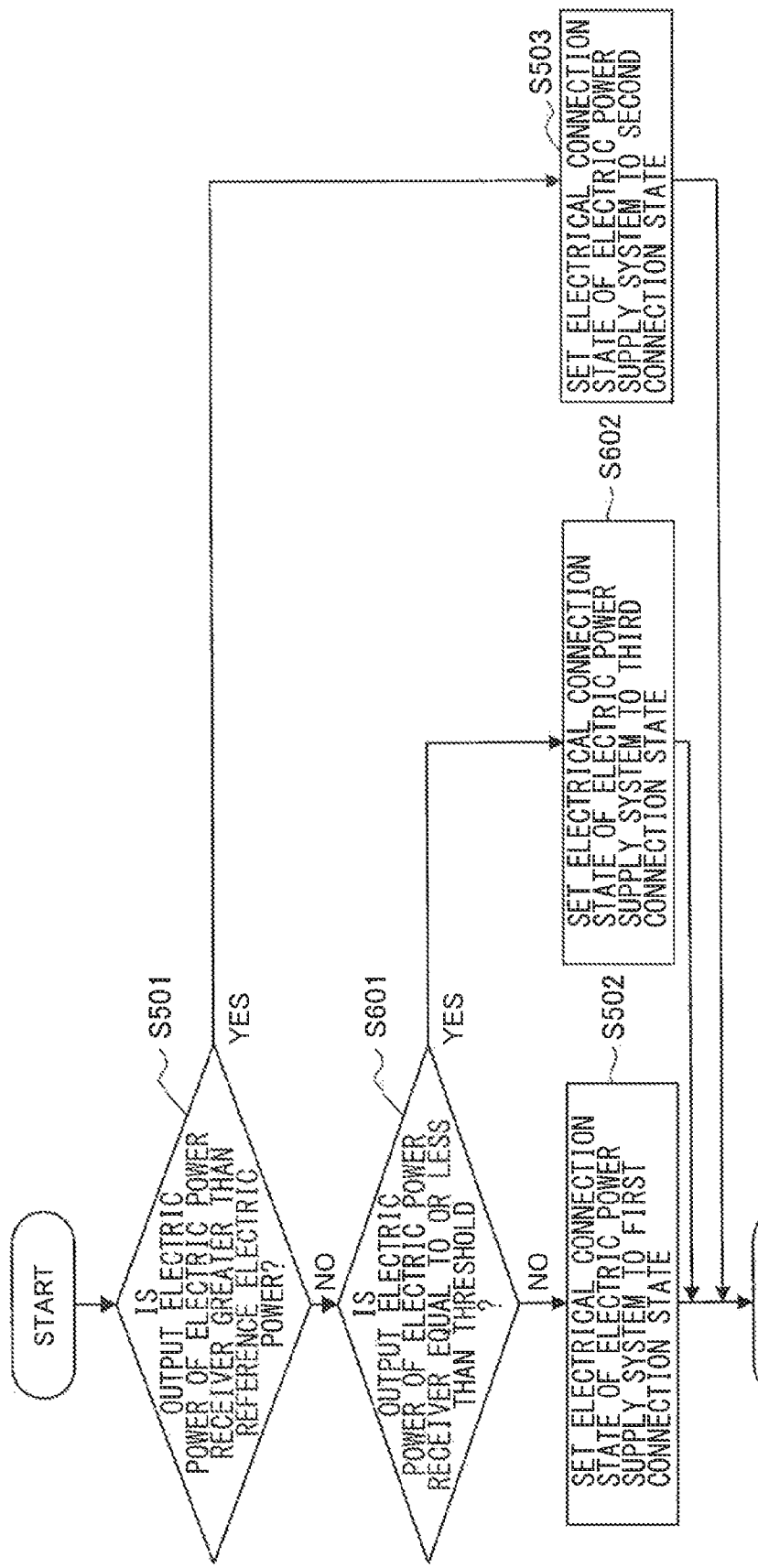
FIG. 6 is a flowchart illustrating a second example of the flow of the process that is performed by the control apparatus according to the example embodiment.

FIG. 6 is a flowchart illustrating the second example of the flow of the process performed by the control apparatus 100. In one example, the control flow illustrated in FIG. 6 may be repeatedly executed by the controller 120 during the execution of the load driving mode, like the control flow illustrated in FIG. 3.

The second example may differ from the above-described first example in a flow of a process that is performed in a case where the output electric power of the electric power receiver 40 is determined to be equal to or less than the reference electric power.

In the control flow according to the second example illustrated in FIG. 6, if the determination result is YES in step S501, the control flow may proceed to step S503, as in the control flow according to the first example illustrated in FIG. 3. If the determination result is NO in step S501, the control flow may proceed to step S601, unlike in the control flow according to the first example illustrated in FIG. 3.

If the determination result is NO in step S501, in step S601, the controller 120 may determine whether the output electric power of the electric power receiver 40 is equal to or less than a threshold that is smaller than the reference electric power. If it is determined that the output electric power of the electric power receiver 40 is equal to or less than the threshold (step S601/YES), the control flow may proceed to step S602. If it is determined that the output electric power of the electric power receiver 40 is greater than the threshold (step S601/NO), the control flow may proceed to step S502.

If the determination result is YES in step S601, in step S602, the controller 120 may set the electrical connection state of the electric power supply system 1 to a third connection state.

The third connection state will be described with reference to FIG. 7. FIG. 7 is a diagram illustrating the third connection state out of the electrical connection states of the electric power supply system 1. For easier understanding, FIG. 7 does not illustrate the sensors and the control apparatus 100.

Figure 7:
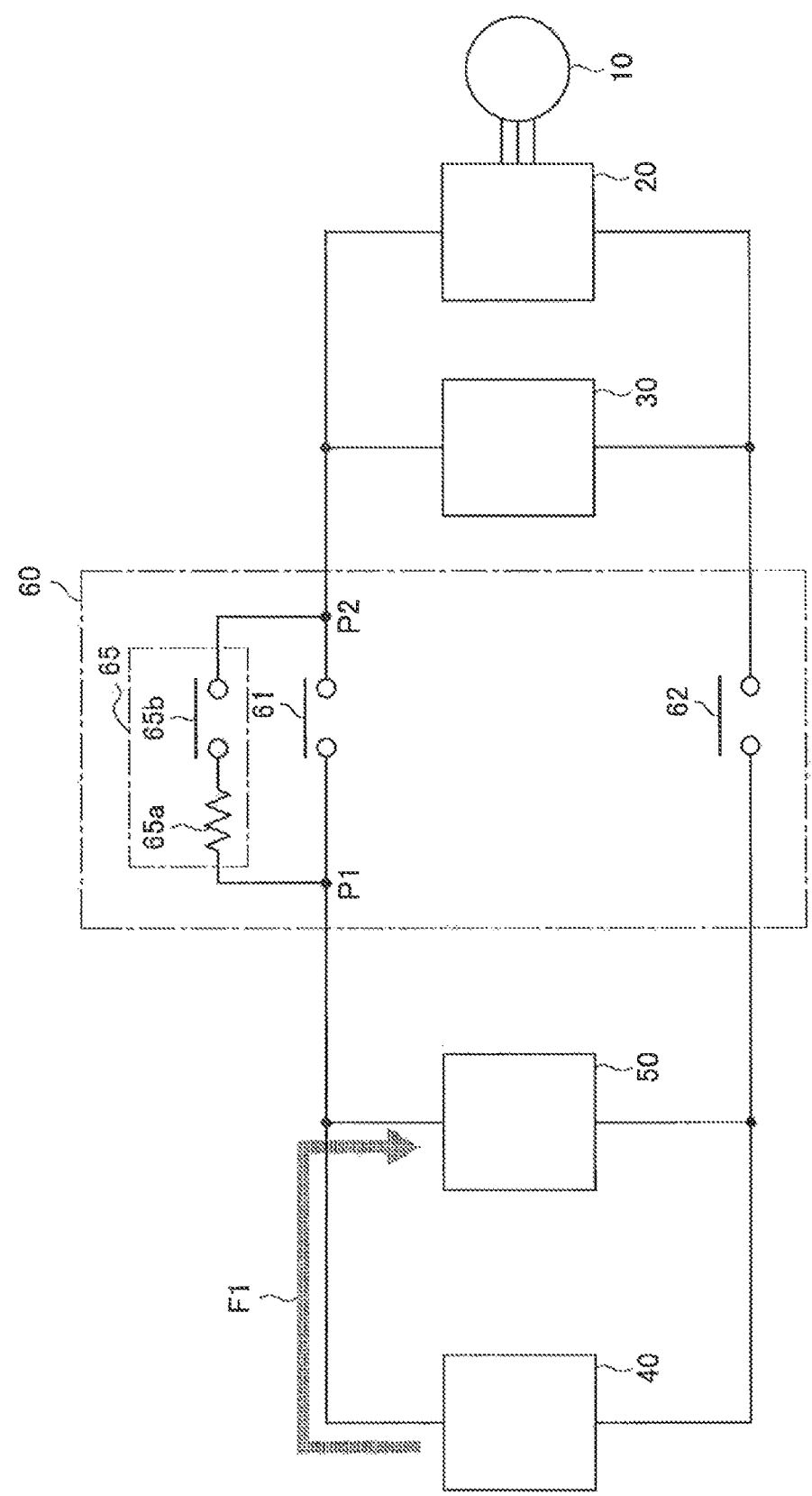
FIG. 7 is a diagram illustrating a third connection state out of the electrical connection states of the electric power supply system according to the example embodiment.

As illustrated in FIG. 7, the third connection state may be a connection state in which the electric power receiver 40 and the load 50 are electrically cut off from the battery 30 by the switcher 60. In one example, in the third connection state, the open/closed states of the positive electrode-side relay 61, the negative electrode-side relay 62, and the pre-charge relay 65*b* may all be the open state.

In the third connection state, as indicated by arrow F1 in FIG. 7, electric power may be supplied from the electric power receiver 40 to the load 50, as in the first connection state and the second connection state. In the third connection state, the electric power receiver 40 and the load 50 may be electrically cut off from the battery 30 by the switcher 60. Accordingly, no electric power supply may occur between the load 50 and the battery 30. This makes it possible to effectively suppress the input and output currents of the battery 30.

After step S502, step S503, or step S602, the control flow illustrated in FIG. 6 may end.

As described above, in the control flow illustrated in FIG. 6, while the output electric power of the electric power receiver 40 increases, it is possible to switch the electrical connection state of the electric power supply system 1 in order of the third connection state, the first connection state, and the second connection state. It is possible to suppress welding of the positive electrode-side relay 61 by setting the electrical connection state of the electric power supply system 1 to the first connection state before setting the electrical connection state of the electric power supply system 1 to the second connection state, as in the above-described control flow illustrated in FIG. 3. Furthermore, in a case where the output electric power of the electric power receiver 40 is equal to or less than the reference electric power and equal to or less than the threshold, setting the electrical connection state of the electric power supply system 1 to the third connection state makes it possible to effectively suppress the input and output currents of the battery 30.

3. EXAMPLE EFFECTS OF ELECTRIC POWER SUPPLY SYSTEM

Now, example effects of the electric power supply system 1 according to the example embodiment of the technology will be described.

In the electric power supply system 1 according to the example embodiment, in a state in which the electric power receiver 40 is able to receive electric power, the controller 120 is able to execute the load driving mode of permitting driving of the load 50 that is coupled to the battery 30 in parallel with the electric power receiver 40. In a case where the electric power receiver 40 and the load 50 are coupled to the battery 30 to allow for electric power supply via the switcher 60, the switcher 60 is switchable between the normal state and the current suppression state. The current suppression state has a current suppression effect higher than that of the normal state. The controller 120 may set, in the load driving mode, the electrical connection state of the electric power supply system 1 to the first connection state, depending on the output electric power of the electric power receiver 40. In the first connection state, the electric power receiver 40 and the load 50 may be coupled to the battery 30 to allow for electric power supply via the switcher 60 in the current suppression state. This makes it possible to suppress an excessive increase in voltage difference between the load 50 side and the battery 30 side with respect to the switcher 60. This helps to attain a state in which welding of the positive electrode-side relay 61 is suppressed when the switcher 60 is switched to the normal state. Furthermore, it is possible to suppress the input and output currents of the battery 30, making it possible to suppress deterioration of the battery 30 due to repetition of charging and discharging of the battery 30. This helps to appropriately suppress deterioration of the battery 30.

In the electric power supply system 1 according to the example embodiment, while the electrical connection state of the electric power supply system 1 is the first connection state in the load driving mode, the controller 120 may control the voltage of the electric power receiver 40 to suppress the input and output currents of the battery 30. Thus, for example, it is possible to effectively suppress the input and output currents of the battery 30, as compared with a case of controlling the voltage of the electric power receiver 40 with higher priority put on electric power efficiency.

In the electric power supply system 1 according to the example embodiment, in the load driving mode, the controller 120 may set the electrical connection state of the electric power supply system 1 to the first connection state if it is determined that the output electric power of the electric power receiver 40 is equal to or less than the reference electric power. The controller 120 may set the electrical connection state of the electric power supply system 1 to the second connection state if it is determined that the output electric power of the electric power receiver 40 is greater than the reference electric power. In the second connection state, the electric power receiver 40 and the load 50 may be coupled to the battery 30 to allow for electric power supply via the switcher 60 in the normal state. Thus, in a case where it is possible to cover the electric power consumed by the load 50 by only the output electric power of the electric power receiver 40, it is possible to suppress the input and output currents of the battery 30 by setting the electrical connection state of the electric power supply system 1 to the first connection state. In a case where it is difficult to cover the electric power consumed by the load 50 by only the output electric power of the electric power receiver 40, it is possible to suppress lack of the electric power supplied to the load 50 by setting the electrical connection state of the electric power supply system 1 to the second connection state. Furthermore, it is possible to set the electrical connection state of the electric power supply system 1 to the first connection state before setting the electrical connection state of the electric power supply system 1 to the second connection state. This makes it possible to suppress welding of the positive electrode-side relay 61.

In the electric power supply system 1 according to the example embodiment, even if it is determined that the output electric power of the electric power receiver 40 is greater than the reference electric power in the load driving mode, the controller 120 may prohibit the electrical connection state of the electric power supply system 1 from being set to the second connection state if it is determined that the amount of decrease per unit time in the voltage on the load 50 side with respect to the switcher 60 is larger than the reference amount of decrease. Here, the amount of decrease per unit time in the voltage on the load 50 side with respect to the switcher 60 being larger than the reference amount of decrease indicates that the voltage difference is relatively likely to excessively increase between the load 50 side and the battery 30 side with respect to the switcher 60. Therefore, prohibiting the electrical connection state of the electric power supply system 1 from being set to the second connection state in such a case makes it possible to effectively suppress welding of the positive electrode-side relay 61.

In the electric power supply system 1 according to the example embodiment, after setting the electrical connection state of the electric power supply system 1 to the second connection state in the load driving mode, the controller 120 may keep the electrical connection state of the electric power supply system 1 at the second connection state, regardless of the output electric power of the electric power receiver 40, until the reference time passes. This makes it possible to suppress excessively frequent execution of the open/close operation of the positive electrode-side relay 61 caused by the electrical connection state of the electric power supply system 1 being excessively frequently switched between the first connection state and the second connection state. This helps to suppress wear due to the open/close operation of the positive electrode-side relay 61.

In the electric power supply system 1 according to the example embodiment, after setting the electrical connection state of the electric power supply system 1 to the second connection state in the load driving mode, the controller 120 may keep the electrical connection state of the electric power supply system 1 at the second connection state, regardless of the output electric power of the electric power receiver 40, until the remaining capacity of the battery 30 reaches the reference remaining capacity. Thus, in the second connection state, it is possible to appropriately recover the remaining capacity of the battery 30 that has decreased due to electric power supply from the battery 30 to the load 50. In other words, it is possible to suppress a decrease in the remaining capacity of the battery 30.

In the electric power supply system 1 according to the example embodiment, in the load driving mode, the controller 120 may set the electrical connection state of the electric power supply system 1 to the third connection state if it is determined that the output electric power of the electric power receiver 40 is equal to or less than the threshold smaller than the reference electric power. In the third connection state, the electric power receiver 40 and the load 50 may be electrically cut off from the battery 30 by the switcher 60. Thus, in a case where the output electric power of the electric power receiver 40 is equal to or less than the reference electric power and equal to or less than the threshold, setting the electrical connection state of the electric power supply system 1 to the third connection state makes it possible to effectively suppress the input and output currents of the battery 30.

In the electric power supply system 1 according to the example embodiment, the switcher 60 may include the relay (e.g., the positive electrode-side relay 61) and the current suppressor 65 having a current suppression effect higher than that of the relay. The relay and the current suppressor 65 may be coupled in parallel to each other. The first connection state may be a connection state in which the relay is open, and the electric power receiver 40 and the load 50 are coupled to the battery 30 to allow for electric power supply via the current suppressor 65. Thus, electric power supply may occur between the load 50 and the battery 30, but it is possible for the current suppressor 65 to suppress a current flowing between the load 50 and the battery 30. This makes it possible to appropriately suppress an excessive increase in voltage difference between the load 50 side and the battery 30 side with respect to the switcher 60.

In the electric power supply system 1 according to the example embodiment, the second connection state may be a connection state in which the electric power receiver 40 and the load 50 are coupled to the battery 30 to allow for electric power supply via the above relay (i.e., the relay coupled in parallel to the current suppressor 65). This makes it possible to appropriately achieve electric power supply in a state in which current is not suppressed between the load 50 and the battery 30.

4. CONCLUSION

As described above, in the example embodiment, it is possible to suppress deterioration of the battery. In one example, in the electric power supply system 1 according to the example embodiment, in the load driving mode permitted in a state in which the electric power receiver 40 is able to receive electric power, the controller 120 may set the electrical connection state of the electric power supply system 1 to the first connection state in which the electric power receiver 40 and the load 50 are coupled to the battery 30 to allow for electric power supply via the switcher 60 in the current suppression state, depending on the output electric power of the electric power receiver 40. This makes it possible to suppress, in the load driving mode, repetition of charging and discharging of the battery 30, making it possible to suppress deterioration of the battery 30 due to repetition of the charging and discharging.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the above description describes the electric power supply system 1 with reference to FIG. 1, but the electric power supply system 1 illustrated in FIG. 1 is merely an example of an electric power supply system according to any embodiment of the technology. An electric power supply system according to any embodiment of the technology may be the electric power supply system 1 in FIG. 1 modified in a variety of ways as appropriate. Examples of such modification may include addition, deletion, and change of elements.

For example, for easier understanding, FIG. 1 does not illustrate an element interposed between the inverter 20 and the battery 30. However, an inverter switcher that allows or cuts off electrical connection between the inverter 20 and the battery 30 may be provided between the inverter 20 and the battery 30. It is to be noted that FIG. 1 illustrates the inverter 20 and the driving motor 10 provided on the battery 30 side with respect to the switcher 60, but the inverter 20 and the driving motor 10 may be provided on the load 50 side with respect to the switcher 60. In that case, it is possible for the switcher 60 to allow or cut off electrical connection between the inverter 20 and the battery 30. This may eliminate the need for providing the above inverter switcher separately from the switcher 60, making it possible to reduce cost.

In addition, the processes described with reference to the flowcharts in this specification do not necessarily have to be executed in the order illustrated in the flowcharts. Furthermore, additional processing steps may be adopted, or some processing steps may be omitted.

The control apparatus 100 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the control apparatus 100 illustrated in FIG. 2.

The invention claimed is:

1. An electric power supply system comprising:
a battery;
an electric power receiving apparatus coupled to the battery in parallel with a load, and configured to receive external electric power and supply the external electric power to the battery;
a switching apparatus configured to allow or cut off connection of the electric power receiving apparatus and the load to the battery, and configured to be switched in state, when the electric power receiving apparatus and the load are coupled to the battery, between a normal state and a current suppression state in which flow of a current via the switching apparatus is suppressed more than in the normal state; and
a control apparatus configured to permit a load driving mode of driving the load in a case where the electric power receiving apparatus is able to receive the external electric power, and configured to, in the load driving mode, control an electrical connection state of the electric power supply system to a first connection state in which the electric power receiving apparatus and the load are coupled to the battery via the switching apparatus in the current suppression state, depending on output electric power of the electric power receiving apparatus,
wherein
the control apparatus is configured to calculate the output electric power of the electric power receiving apparatus using at least one of voltage and current detected by using a sensor installed the electric power supply system, and
the control apparatus is configured to, in the load driving mode,
switch the electrical connection state of the electric power supply system to the first connection state when detecting that the output electric power of the electric power receiving apparatus is equal to or less than reference electric power, and
switch the electrical connection, to of the electric power supply system to a second connection state in which the electric power receiving apparatus and the load are coupled to the battery via the switching apparatus in the normal state when detecting that the output electric power of the electric power receiving apparatus is greater than the reference electric power.

2. The electric power supply system according to claim 1, wherein
the electric power supply system is to be mounted on a vehicle, and
the battery is configured to supply electric power to a driving motor of the vehicle.

3. The electric power supply system according to claim 2, wherein the control apparatus is further configured to, in the load driving mode, control a voltage of the electric power receiving apparatus to suppress input and output currents of the battery in a case where the electrical connection state of the electric power supply system is the first connection state.

4. The electric power supply system according to claim 1, wherein the control apparatus is further configured to, in the load driving mode, control a voltage of the electric power receiving apparatus to suppress input and output currents of the battery in a case where the electrical connection state of the electric power supply system is the first connection state.

5. The electric power supply system according to claim 1, wherein the control apparatus is further configured to, in the load driving mode, even in a case where the output electric power of the electric power receiving apparatus exceeds the reference electric power, keep the electrical connection state of the electric power supply system at the first connection state if an amount of decrease per unit time in a voltage on a load side with respect to the switching apparatus is greater than a reference amount of decrease, the load side being a side on which the load is provided.

6. The electric power supply system according to claim 1, wherein the control apparatus is further configured to, in the load driving mode, keep the electrical connection state of the electric power supply system at the second connection state, regardless of the output electric power of the electric power receiving apparatus, until a remaining capacity of the battery reaches a reference remaining capacity after setting the electrical connection state of the electric power supply system to the second connection state.

7. The electric power supply system according to claim 1, wherein the control apparatus is further configured to, in the load driving mode, control the electrical connection state of the electric power supply system to a third connection state in which the electric power receiving apparatus and the load are electrically cut off from the battery by the switching apparatus, in a case where the output electric power of the electric power receiving apparatus is equal to or less than a threshold that is smaller than the reference electric power.

8. The electric power supply system according to claim 1, wherein
the switching apparatus includes a relay and a current suppressor that is disposed in parallel with the relay and has a larger electric resistance than the relay, and,
in the first connection state, the relay is open, and the electric power receiving apparatus and the load are coupled to the battery via the current suppressor.

9. The electric power supply system according to claim 8, wherein, in the second connection state, the electric power receiving apparatus and the load are coupled to the battery via the relay.

10. An electric power supply system comprising:
a battery;
an electric power receiving apparatus coupled to the battery in parallel with a load, and configured to receive external electric power and supply the external electric power to the battery;
a switching apparatus configured to allow or cut off connection of the electric power receiving apparatus and the load to the battery, and configured to be switched in state, when the electric power receiving apparatus and the load are coupled to the battery, between a normal state and a current suppression state in which flow of a current via the switching apparatus is suppressed more than in the normal state; and
a control apparatus configured to permit a load driving mode of driving the load in a case where the electric power receiving apparatus is able to receive the external electric power, and conjured to, in the load driving mode, control an electrical connection state of the electric power supply system to a first connection state in which the electric power receiving apparatus and the load are coupled to the battery via the switching apparatus in the current suppression state depending on output electric power of the electric power receiving apparatus,
wherein the control apparatus is further configured to, in the load driving, mode
control the electrical connection state of the electric power supply system to the first connection state in a case where the output electric power of the electric power receiving apparatus is equal to or less than reference electric power, and control the electrical connection state of the electric power supply system to a second connection state in which the electric power receiving apparatus and the load are coupled to the battery via the switching apparatus in the norm state in a case where the output electric power of the electric Rower receiving apparatus is heater than the reference electric power, wherein the control apparatus is further configured to, in the load driving mode, even in a case where the output electric power of the electric power receiving apparatus exceeds the reference electric power, keep the electrical connection state of the electric power supply system at the first connection state if an amount of decrease per unit time in a voltage on a load side with respect to the switching apparatus is greater than a reference amount of decrease, the load side being a side on which the load is provided.

11. The electric power supply system according to claim 10, wherein the control apparatus is further configured to, in the load driving mode, keep the electrical connection state of the electric power supply system at the second connection state, regardless of the output electric power of the electric power receiving apparatus, until a reference time passes after setting the electrical connection state of the electric power supply system to the second connection state.

12. The electric power supply system according to claim 10, wherein the control apparatus is further configured to, in the load driving mode, keep the electrical connection state of the electric power supply system at the second connection state, regardless of the output electric power of the electric power receiving apparatus, until a remaining capacity of the battery reaches a reference remaining capacity after setting the electrical connection state of the electric power supply system to the second connection state.

13. The electric power supply system according to claim 10, wherein the control apparatus is further configured to, in the load driving mode, control the electrical connection state of the electric power supply system to a third connection state in which the electric power receiving apparatus and the load are electrically cut off from the battery by the switching apparatus, in a case where the output electric power of the electric power receiving apparatus is equal to or less than a threshold that is smaller than the reference electric power.

14. The electric power supply system according to claim 10, wherein the switching apparatus includes a relay and a current suppressor that is disposed in parallel with the relay and has a larger electric resistance than the relay, and, in the first connection state, the relay is open, and the electric power receiving apparatus and the load are coupled to the battery via the current suppressor.

15. The electric power supply system according to claim 14, wherein, in the second connection state, the electric power receiving apparatus and the load are coupled to the battery via the relay.

16. An electric power supply system comprising:

a battery;

an electric power receiving apparatus coupled to the battery in parallel with a load, and configured to receive external electric power and supply the external electric power to the battery;

a switching apparatus configured to allow or cut off connection of the electric power receiving apparatus and the load to the battery, and configured to be switched in state, when the electric power receiving apparatus and the load are coupled to the battery, between a normal state and a current suppression state in which flow of a current via the switching apparatus is suppressed more than in the normal state; and a control apparatus configured to permit a load driving mode of driving the load in a case where the electric power receiving apparatus is able to receive the external electric power, and configured to, in the load driving mode, control an electrical connection state of the electric power supply system to a first connection state in which the electric power receiving apparatus and the load are coupled to the battery via the switching apparatus in the current suppression state depending on output electric power of the electric power receiving apparatus, wherein the control apparatus is further configured to, in the load driving mode, control the electrical connection state of the electric power supply system to the first connection state in a case where the output electric power of the electric power receiving apparatus is equal to or less than reference electric power, and control the electrical connection state of the electric power supply system to a second connection state in which the electric power receiving apparatus and the load are coupled to the battery via the switching apparatus in the normal state in a case where the output electric power of the electric power receiving apparatus is greater than the reference electric power, wherein the control apparatus is further configured to, in the load driving mode, keep the electrical connection state of the electric power supply system at the second connection state, regardless of the output electric power of the electric power receiving apparatus, until a reference time passes after setting the electrical connection state of the electric power supply system to the second connection state.

* * * * *